United States Patent [19]

Morimoto et al.

[11] Patent Number: 4,809,084
[45] Date of Patent: Feb. 28, 1989

[54] APPARATUS FOR PROCESSING VIDEO SIGNAL

[75] Inventors: Takeshi Morimoto; Kunio Sekimoto, both of Osaka, Japan

[73] Assignee: Matsushita Electric Industrial Co., Ltd., Japan

[21] Appl. No.: 923,832

[22] PCT Filed: Feb. 3, 1986

[86] PCT No.: PCT/JP86/00042
§ 371 Date: Oct. 8, 1986
§ 102(e) Date: Oct. 8, 1986

[87] PCT Pub. No.: WO86/04760
PCT Pub. Date: Aug. 14, 1986

[30] Foreign Application Priority Data

| Feb. 4, 1985 [JP] | Japan | 60-19451 |
| Feb. 8, 1985 [JP] | Japan | 60-23884 |
| Mar. 18, 1985 [JP] | Japan | 60-53910 |
| Mar. 26, 1985 [JP] | Japan | 60-61118 |
| Jun. 10, 1985 [JP] | Japan | 60-125333 |

[51] Int. Cl.$^4$ .............................................. H04N 9/89
[52] U.S. Cl. .................................................... 358/324
[58] Field of Search ............ 358/310, 319, 320, 330, 358/14, 12, 323, 324, 326, 312, 313

[56] References Cited

U.S. PATENT DOCUMENTS

| 4,335,393 | 6/1982 | Pearson | 358/310 |
| 4,520,401 | 5/1985 | Takahashi et al. | 358/310 |
| 4,630,131 | 12/1986 | Ichinoi et al. | 358/323 |
| 4,668,997 | 5/1987 | Nagano et al. | 358/323 |
| 4,672,470 | 6/1987 | Morimoto et al. | 358/323 |
| 4,677,464 | 6/1987 | Yamaji et al. | 358/312 |
| 4,677,497 | 6/1987 | Yoshinaka | 358/310 |

FOREIGN PATENT DOCUMENTS

| 54-134925 | 10/1979 | Japan | 358/323 |
| 60-127895 | 7/1985 | Japan | 358/323 |

Primary Examiner—Donald McElheny, Jr.
Attorney, Agent, or Firm—Lowe, Price, LeBlanc, Becker & Shur

[57] ABSTRACT

The present invention is applied to recording/reproducing apparatus such as a video tape recorder or video signal transmitting apparatus which comprises an decoder (36) and an encoder (16), and is arranged to separate luminance and two chrominance signal components from a composite video signal, to transmit an information signal indicative of the phase of chrominance subcarrier within the composite video signal on decoding; and to control the phase relationship between the composite video signal and chrominance subcarrier during encoding on the basis of the information signal thereby removing or minimizing distortion in high frequency range of the luminance signal and the chrominance signal.

14 Claims, 8 Drawing Sheets

RECORDING SYSTEM

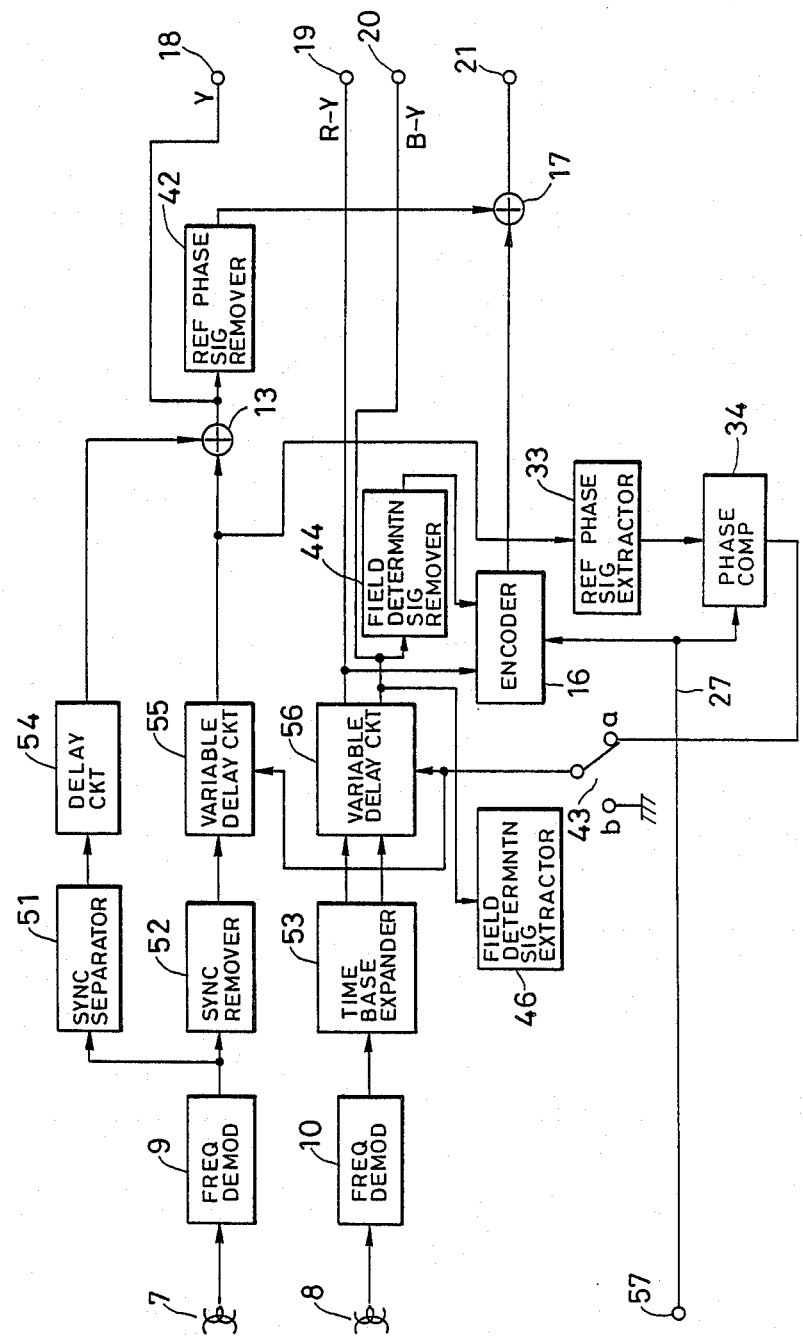

APPARATUS FOR PROCESSING VIDEO SIGNAL

TECHNICAL FIELD

This invention can be used for recording/reproducing apparatus such as a VTR and for video signal transmitting apparatus, and is effective for obtaining satisfactory high frequency characteristic of the luminance signal and chrominance signal characteristic.

BACKGROUND ART

Most VTRs used for broadcasting are of 1-inch tape width or 2-inch tape width, and video signal recording system is such that a composite video signal is frequency modulated without any change. In recording-/reproducing process, time base variation occurs due to the irregularity in the head rotation, the irregularity in tape travel or the like. This variation is corrected by a time base corrector (TBC) during reproduction by using horizontal sync signal or burst signal in the reproduced video signal. However, since the chrominance signal according to this system is subjected to quadrature modulation in NTSC system by subcarrier of 3.58 MHz to be superimposed upon luminance signal, when frequency modulated, it departs from its modulation carrier, and thus reduction of noise, which is a feature of FM, is not sufficient. Furthermore, chrominance subcarrier suffers from phase variation as much as residual jitter of TBC, and this becomes phase noise and thus the convergence of color vectors is insufficient.

As described in Japanese patent application No. 59-163155, there is a method for improving S/N of amplitude and phase direction of chrominance signal so as to improve the convergence in view of the above. According to this method two components of chrominance signal are also frequency modulated before recording, and time base correction is effected on playback before it is modulated (encoded) by a reference subcarrier to be added to luminance signal to form a composite video signal. According to this method since the chrominance signal (component signal) is also FM recorded at base band, reproduction is effected with good S/N. In addition, since encoding is effected with the reference subcarrier, there occurs no phase noise and thus it is possible to obtain satisfactory reproduced chrominance signal.

A conventional example of this system will be described with reference to FIG. 1. In FIG. 1, the references 1, 2 and 3 are input terminals for luminance signal Y, R-Y signal and B-Y signal; the reference 25, a sync signal generator; the reference 5, time base compressor; the references 4 and 6, frequency modulators; the references 7 and 8, heads, the references 9 and 10, frequency demodulator; the references 11 and 12, TBCs; the reference 14, reference signal input terminal; the reference 15, a sync generator; the reference 16, an encoder; the references 18, 19, 20 and 21, output terminals for Y signal, R-Y signal, B-Y signal and a composite video signal. The Y signal fed to the terminal 1 is modulated by the frequency modulator 4 to be recorded on a tape via the head 7. On the other hand, two chrominance signal components R-Y signal and B-Y signal fed to the terminals 2 and 3 are compressed by the time base compressor 5 in unit of 1 line so that time base becomes one half with a sync signal produced by the sync signal generator 25 using horizontal sync signal included in the Y signal being added to the R-Y signal. As a result, these signals are formed into a single signal such as R-Y·B-Y·R-Y·B-Y . . . (R-Y indicates R-Y signal compressed to ½ line) to be modulated by the frequency modulator 6 so as to be recorded on a tape via the head 8. Luminance signal and chrominance signal are recorded on a tape with different tracks being formed by the heads 7 and 8. Y signal reproduced by the head 7 on playback is demodulated by the frequency demodulator 9 and the time base thereof is corrected by the TBC 11. Chrominance signal reproduced by the head 8 is demodulated by the frequency demodulator 10, and the time base thereof is corrected by the TBC 12 and is expanded to its original length. The TBCs 11 and 12 writes a signal into a memory using a write clock generated using horizontal sync signal included in a reproduced and demodulated signal, and also performs time base correction and expansion by reading out signals from a memory using read out clock pulses which are generated by the sync generator 15 using a reference signal fed to the terminal 14. In addition, sync signal is removed, and a reference sync signal 24 generated by the sync generator 15 is added to the Y signal by the adder 13. In this way, it is changed to a sync signal having no noise so that reproduced Y, R-Y and B-Y signals are obtained at terminals 18, 19 and 20. On the other hand, the output, i.e. R-Y and B-Y signals, from the TBC 12 are encoded by the encoder 16 using a reference subcarrier 27 generated by the sync generator 15. Then these signals are added to Y signal by the adder 17 so that a reproduced composite video signal is obtained at terminal 21.

According to this system, since Y, R-Y and B-Y signals are used as inputs, when recording a composite video signal, these signals are led to input terminals 1, 2 and 3 after separation into Y, R-Y and B-Y signals by a decoder. On such separation, in order to provide wide band for the luminance signal and the chrominance signal, a comb filter using line correlation is generally employed.

The separation into luminance and chrominance signals using a comb filter results in the mixing of luminance signal into chrominance signal or vice versa in connection with portions where no correlation exists. The chrominance signal components R-Y and B-Y signals are added to a reproduced luminance signal after being converted into a carrier chrominance signal through modulation again by an encoder after reproduction. During modulation, when these signals are modulated by carrier having the same phase as the carrier chrominance signal which is not yet demodulated, to be added to the chrominance signal mixed into the luminance signal with the same phase, then the respectively mixed components are restored to their original states. If this is done, the high frequency components of the luminance signal are also transmitted after being mixed with the chrominance signal to be added to a signal transmitted in the luminance signal band with a right phase to obtain a satisfactory signal. In addition, the chrominance signal is also restored into its original state to obtain a signal having no color discrepancy or variation in saturation. However, the phase of chrominance subcarrier of the output signal from VTRs is generally arranged to be changed freely, in the TBC, with respect to the phase of the chrominance subcarrier of the reference signal from the input terminal 14 for the delay adjustment in connection with other video signal systems. Furthermore, while the phase of chrominance subcarrier of the input composite video signal on recording takes a round with four fields in the case of NTSC, the phase relationship between the reproduced signal and the reference input signal is usually only the decision of odd or even field. In such a case, the phase of the chrominance subcarrier to be modulated by the R-Y and B-Y signals and the phase of the original composite video signal are not determined. When modulated with a phase opposite to its original, the color at the portion where no correlation exists disappears, and the high frequency components of the luminance signal will disappear. Furthermore, unless the phases are completed matched, there occurs distortion in the high frequency range of the luminance signal and the chrominance signal.

Such phenomena would also occur to some extent when a low pass filter or a band pass filter is used without using a comb filter for the separation of the luminance and chrominance signal.

When dubbing a video signal with such a VTR, it is better that such dubbing is effected using a component output since the video signal necessarily passes through the luminance and chrominance separation circuit again when dubbing is effected with the video signal being converted into a composite video signal. In this case, a reproduced signal after several times of dubbing is finally encoded into a composite video signal. At this time, the same problem as described in the above would arise.

DISCLOSURE OF THE INVENTION

The present invention contemplates to provide measures for obtaining satisfactory reproduced and/or transmitted signals by removing distortion in the high frequency range of the luminance signal and in the chrominance signal.

The present invention is apparatus for processing video signal arranged to obtain a composite video signal by separating a luminance signal and a chrominance signal from a composite video signal so as to be recorded/reproduced or transmitted and then to modulate two chrominance signal components again to superimpose upon the luminance signal, characterized by transmission means for transmitting a first signal indicative of at least one of the phase of the chrominance subcarrier within the original composite video signal and the phase relationship between the sync signal and the chrominance subcarrier together with at least one of the luminance signal and two chrominance signal components which are to be recorded or transmitted; and control means for controlling the phase relation between a chrominance subcarrier (a second signal) to be modulated by two chrominance signal components which are reproduced or transmitted, reproduced or transmitted luminance signal and the two chrominance signal components on the basis of said first signal.

By using the above-mentioned countermeasure, a composite video signal obtained by reencoding after reproduction or transmission as well as a composite video signal obtained by finally encoding after dubbing or retransmission from the component output terminal is such that the phase of the high frequency range of the luminance signal and the chrominance signal is the same as that of the original input signal or since the distortion is minimum, the resolution at portions where no correlation exists is satisfactory while the picture quality is superior because of no color discrepancy.

BRIEF DESCRIPTION OF THE DRAWINGS

FIG. 3 is a block diagram showing another embodiment;

BEST MODE FOR PRACTICING THE INVENTION

Figure 1:
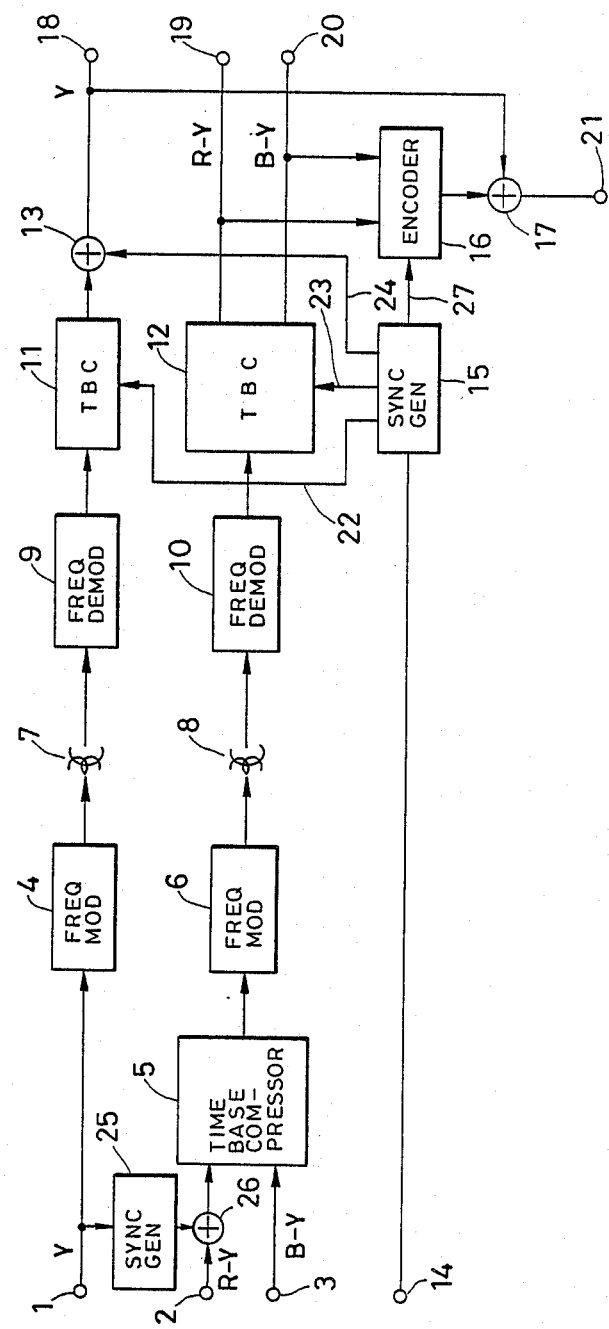
FIG. 1 is a block diagram showing a conventional example.
Figure 2A:
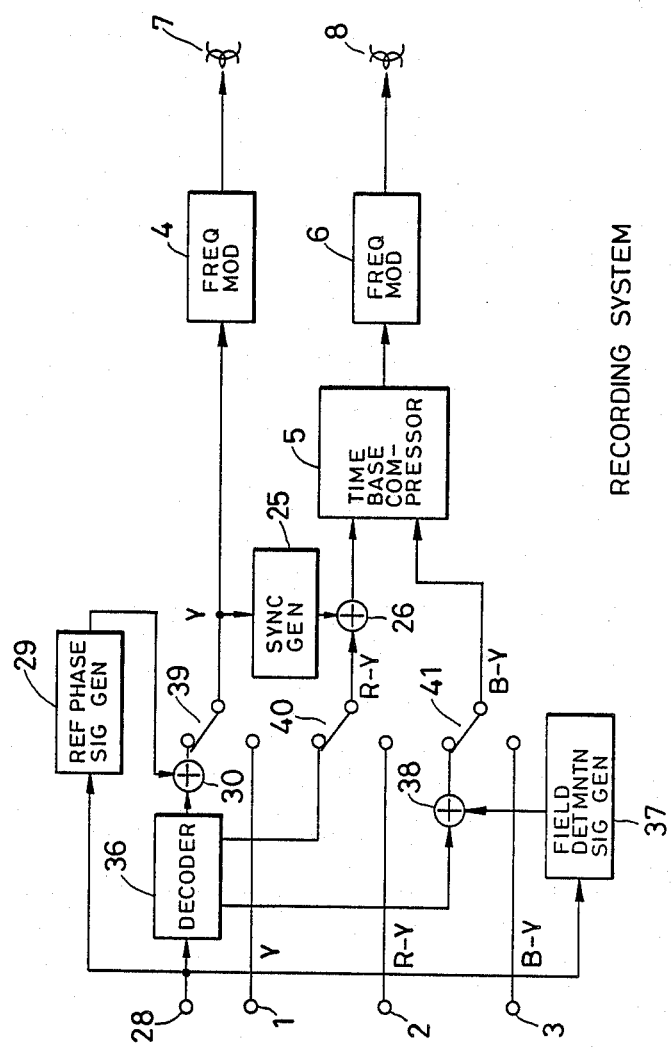
FIG. 2 is a block diagram of apparatus for processing video signal according to an embodiment of the present invention.
Figure 2B:
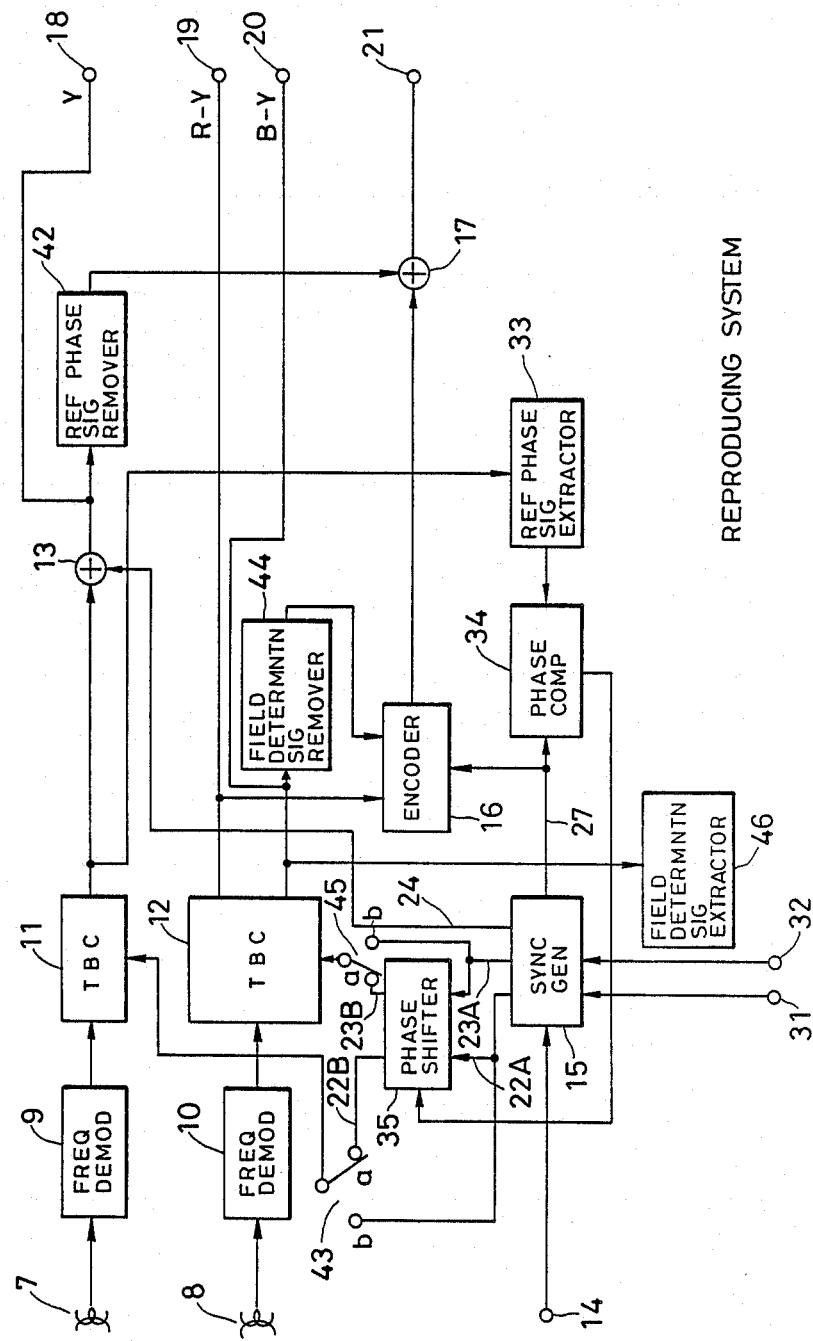

Referring to FIG. 2 showing a block diagram of apparatus for processing video signal according to an embodiment of the present invention, the instant invention will be described hereinbelow. FIG. 2a shows a recording system and FIG. 2b shows a reproducing system. In FIG. 2, the same numerals as in FIG. 1 designate the same parts which operate in the same way. The reference 28 is a composite video signal input terminal; 29, a reference phase signal generator; 36, a decoder; 30 and 38, adders; 31, a video signal phase adjusting signal input terminal; 32, chrominance subcarrier phase adjusting signal input terminal; 33, a reference phase signal extractor; 34, a phase comparator; 35, a phase shifter; 37, field determination signal generator; 39, 40, 41, 43 and 45, switches; 42, a reference phase signal remover; 44, a field determination signal remover; and 46, a field determination signal extractor. Switches 39, 40 and 41 are used for switching between Y, R-Y and B-Y signals fed to the terminals 1, 2 and 3 and Y, R-Y and B-Y signals separated by the decoder 36. In the case of recording a composite video signal, the switches are connected to the side the decoder. At this time, the composite video signal fed to the terminal 28 is separated into Y, R-Y and B-Y signals by the decoder 36. At this time, at the portions where no correlation exists, chrominance signal components remain in the Y signal, and Y signal components remain in the R-Y and B-Y signals. To decoder output Y signal is added a reference phase signal (i.e. a signal having the same frequency as the chrominance subcarrier or a signal synchronous with the chrominance subcarrier; this signal will be treated as having the same frequency, i.e. 3.58 MHz in NTSC signal, as the chrominance subcarrier in the following description), which is generated by the reference phase signal generator 29 from the chrominance subcarrier (this is produced from burst signal, VIR signal or the like) of the input composite video signal, in the adder 30 at a given place (vertical blanking, burst signal position and so on will be treated as 1 line within a vertical blanking in the following description ) to be recorded on a tape in the same manner as in FIG. 1. On the other hand, to the decoder output B-Y signal is added, in the adder 38, a field determination signal (a signal produced by a method in which a positive pulse is inserted within a given interval in a vertical blanking of first and second fields and a negative pulse is inserted within a given period in a vertical blanking of third and fourth fields in the case of NTSC signal, or by another method in which the same or different polarity pulses are inserted for the first and second fields and third and fourth fields but the pulse insertion location is changed or by a further different method) which is produced by the field determination signal generator 37 using sync signal and chrominance subcarrier of the input composite video signal. Then this signal is recorded on a tape together with R-Y signal in the same manner as in FIG. 1. Also on reproduction, reproduced Y signal is obtained at the output of the TBC 11 and reproduced R-Y and B-Y signals are obtained at the outputs of the TBC 12 in the same matter as in, FIG. 1, and thus reproduced Y, R-Y and B-Y signals are obtained at terminals 18, 19 and 20, while a reproduced composite video signal is obtained at the terminal 21.

Here, the chrominance subcarrier 27 generated by the sync generator 15 will be synchronized with a signal which is fed to the reference signal input terminal 14. On the other hand, when no such signal is fed, the chrominance subcarrier becomes free-running. Furthermore, the phase relationship with respect to the input signal to the terminal 14 can arbitrarily be adjusted using the signal from the chrominance subcarrier phase adjusting signal input terminal 32. Moreover, under a condition that the phase shifter 14 is by-passed (i.e. the switches 43 and 45 are in position b), the read signals (clock and horizontal and vertical reference signals) 22A, 22B, 23A and 23B for the TBC 11 and 12 are arbitrarily moved by the signal from the video signal phase adjusting input terminal so that the phase of the output video signal (Y, R-Y and B-Y signals and the composite video signal) is varied. Therefore, in the example of FIG. 1, the phase relationship between output signal from the TBC and the chrominance subcarrier 27 cannot be determined to result in the occurrence of the above-described problems. This also applies to the case of encoding after dubbing a component output signal. Furthermore, there arises the following disadvantages even in apparatus having a simple structure in which the phase of the output video signal and the phase of the chrominance subcarrier are not varied. Specifically, the VTR having a structure shown in FIG. 1 or 2 is servo controlled so that odd/even field of either the reference signal fed to the terminal 14 or internal sync signal of the sync generator is equal to the odd/even field of the signal reproduced from the tape. However, in the case of NTSC signal, the relationship between the phase of the chrominance subcarrier and field makes a round with four fields. Specifically, although the sync signal is the same as before in first and third fields or in second and fourth fields, the chrominance subcarrier is in inverted state. In the above described servo control, although it is possible to distinguish first and third fields from second and fourth fields, it is impossible to distinguish between first and third fields and also between second and fourth fields. Therefore, even if the phase of the reproduced signal is aligned with that of chrominance subcarrier using the reproduced signal of a given state, the phase will be inversed to assume the worst condition when the state is reversed. This can be resolved by performing servo control with which distinction between first-fourth fields is possible. As measures for resolving the above, is a method in which servo control is effected using known color frame servo or field determination signal added to B-Y signal. However, even such is done, it does not work for apparatus arranged to perform control through terminals 31 and 32.

From the above point of view, in the present invention, as in the embodiment of FIG. 2, the reference phase signal added on recording is extracted from the output Y signal from the TBC 11 by way of the reference phase signal extractor 33 so that the phase thereof is then compared with that of the output reference chrominance subcarrier 27 by the phase comparator 34, and a resultant error signal is then led to the phase shifter 35 to control the phase of the TBC reading signals 22A and 23B which are outputs of the sync generator 15 so as to read out Y, R-Y and B-Y signals from the TBCs 11 and 12 using the output signals 22B and 23B (switches 43 and 45 are in position a). In this way, timing of signal reading out of the TBCs is controlled, and thus Y, R-Y and B-Y signals having a residual chrominance subcarrier of the input composite video signal having the same or almost same phase as the chrominance subcarrier 27 can always be obtained at the outputs of the TBCs, obtaining a satisfactory composite video signal at the terminal 21. There are the following methods as the way for controlling the timing of reading out of the TBCs. According to one method, signals which are always in phase are fed to the both inputs of the phase comparator 34 by controlling also the reference phase signal portion (closed control). Another method is such that the reference signal portion is not controlled and the remaining video signal portions are controlled on the basis of the output signal (indicative of the phase difference between the both inputs) from the phase comparator 34 so that the phase of the residual chrominance subcarrier, which is the output from the TBC, approaches the chrominance subcarrier 27 (open control). According to a further method, only the reference phase signal component is read out first, and the phase shifter 35 is set in advance, and then the reference phase signal and the video signal are read out again (first to read control). In the closed control, although the phase of the residual chrominance subcarrier always matches with that of the chrominance subcarrier in considerable accuracy, it is difficult to follow sudden changes, and thus the loop is apt to be stable. In the open control and first to read control, although the system operates stably, and responds quickly to sudden changes, there arises slight difference in phase between the both signals. A slight difference in phase between the both signals remains no matter which method is adopted, but remarkable improvement is still achieved when compared to the case of no control of FIG. 1. When the luminance signal still having the reference phase signal, which still has the phase difference between the both signals, is added to the encoded chrominance signal, then the reference phase signal shows phase different from that of the chrominance subcarrier of the newly encoded chrominance signal. Therefore, addition is effected after the reference phase signal is removed by the reference phase signal remover 42.

In the case of the aforementioned closed control and first to read control, since the reference phase signal, which is output from the TBC, indicates the phase of the chrominance subcarrier within the original input composite video signal, correct operation can be effected on encoding after dubbing even if it is outputted as it is attached to the Y output. However, closed control suffers from the above-mentioned instability, while both closed control and first to read control require more complex circuit arrangement than open control. Meanwhile, in the case of open control, the TBC output the reference phase signal does not indicate the phase of the chrominance subcarrier. Therefore, when finally effecting encoding through dubbing using the Y, R-Y and B-Y signals from the terminals 18, 19 and 20 as the main signal outputs, the switches 43 and 45 are turned to position b, and no phase control is effected. With this arrangement, the reference phase signal maintains the phase of the original chrominance subcarrier and thus correct control can be made on the final encoding. At this time, the output from the terminal 21 may be used for monitoring.

Since vertical blanking suffers from coloring which reverses every two fields when the field determination signal attached to the B-Y signal is encoded as it is, it is removed by the field determination signal remover 44 prior to be fed to the encoder 16. In addition, when this is outputted as it is attached to the B-Y signal, it does not represent correct information irrespective of the closed control, open control or first to read control. The reason why is that if the video signal is read out with a read signal, which has been shifted to a condition different from standard by the phase shifter 35, the phase relationship between sync signal and the chrominance subcarrier would be lost. In this case also, if the switches 43 and 45 are turned to position b so that phase shifting by the TBC is not effected and the position of the sync signal to be added to the TBC output with respect to the video signal is set to the same position or to a position which is different by integral multiple cycles of the chrominance subcarrier (phase adjustment for the video signal from the terminal 31 is also effected intermittently with this period), correct state of the field determination signal can be maintained. In this way, B-Y signal having a correct field determination signal is outputted.

The field determination signal is extracted by the field determination signal extractor 46 so that it may be used for the above-mentioned color frame servo or for the control of the phase shifter 35 in place of the reference phase signal.

Another embodiment (only reproducing system) of the present invention is shown in FIG. 3 and will be described. This is an example in which a TBC is not used and modulation is effected with a the chrominance subcarrier synchronized with the output video signal being given from an external device (such as an external TBC or the like). In FIG. 3, the same numerals as those in FIGS. 1 and 2 designate the same parts which operate in the same manner. The reference 51 is a sync separator; 52, a sync remover; 53, a time base expander; 54, a delay circuit; 55, a variable delay circuit; and 57, a chrominance subcarrier input terminal. Reproduced and demodulated Y signal is led to the variable delay circuit 55 with the sync signal thereof being removed by the sync remover 52. On the other hand, reproduced/demodulated compressed chrominance signal is expanded by way of the time base expander 53 to be restored into R-Y and B-Y signals to be led to the variable delay circuit 56 with the R-Y signal added sync being removed. The reference phase signal is extracted from the output signal from the variable delay circuit 55 by way of the reference phase signal extractor 33 to be compared with the chrominance subcarrier inputted from terminal 57 after being led to the phase comparator 34. To the terminal 57 is applied a chrominance subcarrier produced from the Y signal at the terminal 18 or the sync included in the output composite video signal at the terminal 21. In the case of obtaining the composite video signal as a main output signal the, the switch 43 is turned to position a so that the delay in the variable delay circuits 55 and 56 is controlled by the output difference signal from the phase comparator 34. As a result, Y, R-Y and B-Y signals having exactly the same as or very close to the phase of the chrominance subcarrier can be obtained at the outputs of the variable delay circuits 55 and 56. Accordingly, satisfactory encoding signals are obtained to obtain the same effect as in FIG. 2. The timing of the sync signal separated by the sync separator 51 is adjusted by the fixed delay circuit 54 to be matched with the timing of the standard video signal, and is added to the Y signal in the adder 13. As a result, signals having a continuous sync signal are obtained at terminals 18 and 21.

There is another method of control in which the reference phase signal is extracted from a stage before the variable delay circuit 55.

In the case of finally effecting encoding after dubbing etc, with the component signal being obtained as a main output signal, the switch 43 is turned to position b and the variable delay circuit 54 and 55 are not controlled. At this time, a reference phase signal and a field determination signal which are the same as their original are obtained at outputs Y and B-Y in the same manner as in FIG. 1. In this case, sync replacement may not also made by by-passing the variable delay circuits 55 and 56.

Figure 4:
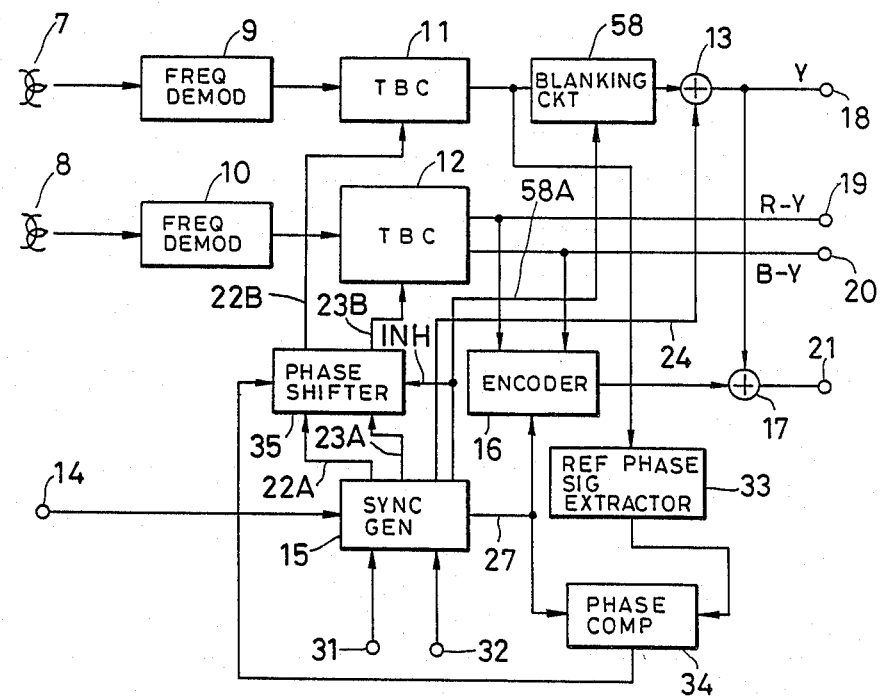
FIG. 4 is a block diagram showing a further embodiment.

Another embodiment (only reproducing system) of the present invention is shown in FIG. 4 and will be described. In the example, the aforementioned first to read control will be described in which the first signal is read out prior to blanking period. The same numerals in FIG. 4 designate the same parts in FIG. 2 and operate in the same manner.

As shown in the embodiment of FIG. 4, the reference phase signal added on recording is extracted by the reference phase signal extractor 33 at a place one line preceding original position to be compared in the phase comparator 34 with the reference chrominance subcarrier 27 which is an output from the sync generator 15, and a resultant error signal is led to the phase shifter 35 to control the phase of TBC reading signals 22A and 22B which are outputs from the sync generator 15. In order to perform such first to read control in this embodiment a blanking signal 58 is led from the sync generator 15 to the phase shifter 35 so that phase control is prohibited with this timing. Using the output signals 22B and 23B the Y, R-Y and B-Y signals are read out of the TBC 11 and 12. After this, the blanking circuit 58 performs blanking in accordance with a blanking signal 58A so that the signal read out of the TBC 11 precedently is not outputted from the terminal 18. In this way, the reference phase signal is read first to lead the above-mentioned error signal to the phase shifter 35 so that the reading out timing from the TBC is controlled, and thus Y, R-Y and B-Y signals having residual chrominance subcarrier within the input video signal having the same phase as or very close phase to the phase of the chrominance subcarrier 27 are obtained at the outputs of the TBCs, while a satisfactory composite video signal is obtained at the terminal 21.

Furthermore, since the first signal at its original position is read out again under a condition of phase control, even if the component signals at terminals 18, 19 and 20 are used for dubbing by another VTR, the mutual relation between the first signal and the chrominance subcarrier within the input composite video signal included in the component signal is not lost. Thus, a satisfactory composite video signal can be obtained at the encoder within the above mentioned another VTR.

Figure 5:
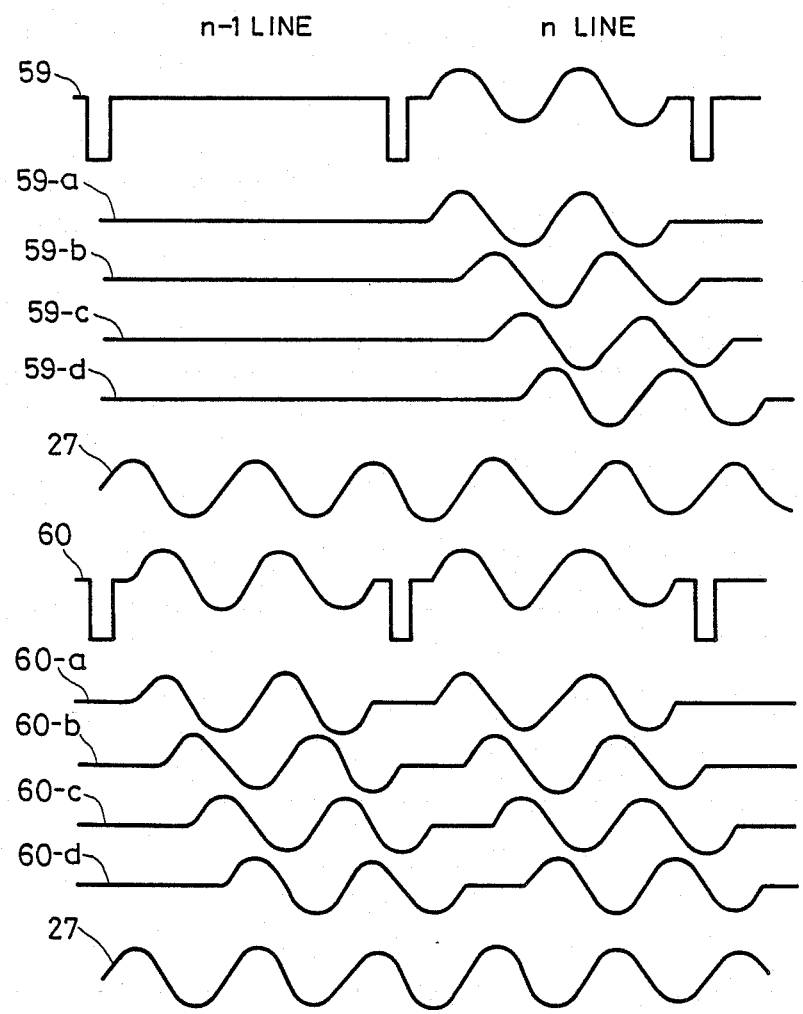
FIG. 5 is a waveform diagram for describing the operation of FIG. 4.

The operation of the phase control with the first signal being read out with one line preceding manner will be described with reference to FIG. 5.

A waveform 59 is an output waveform from the TBC 11 under a condition that the phase shifter 35 of FIG. 4 is not operating. A waveform at $n^{th}$ line is the first signal. The reference 59-a is one that only carrier component is extracted, and the references 59-b, 59-c and 59-d are obtained by shifting reading out point from the TBC 11 every 90° of the subcarrier. A waveform 27 indicates a waveform of a portion designated at the same numeral in FIG. 4, and is a chrominance subcarrier at the encoder. According to the present invention, it is most desirable that the phase of the chrominance subcarrier 27 is as close as possible to the phase of the first signal, and the control is effected such that reading out of the TBC 11 is performed with the phase of the waveform 59-b. With such control of reading phase it takes at least one horizontal scanning period from the instant of detection of phase error till the completion of control for the correct phase because starting address phase for reading out of the TBC internal memories is controlled at an interval of one horizontal scanning line. In this sense, the phase of the first signal superimposed upon $n^{th}$ line does not match with the phase of the video signal after $n+1^{th}$ line, and thus a signal resulted from such component dubbing continuously performed under such condition cannot provide the same effect as the present invention.

Therefore, when phase shift control is effected such that the first signal, which intrinsically appears at $n^{th}$ line, is also read out of a memory at $n-1^{th}$ line, i.e. one line preceding $n^{th}$ line, and then phase error is detected using the first signal read out precedingly, and then the first signal, which should originally be read out at $n^{th}$ line, is again read out at $n^{th}$ line and the phase shift control is performed on the basis of the above-mentioned phase error, then the phase shift of the first signal at $n^{th}$ line would be equal to the phase shift of the video signal at $n+1^{th}$ line or more. As a result, the same effect as the present invention would be obtained even with a signal obtained through component dubbing.

What should be noted here is that when chrominance subcarrier of NTSC system is used as the first signal, since the phase of a portion one horizontal scanning line preceding is 180° reversed, the phase of the first signal at $n^{th}$ line would be equal to the phase of the chrominance subcarrier 27 if the phase of the waveform 60-b, which assumes 180° reversed phase with respect to the chrominance subcarrier 27 in FIG. 2, is selected on the detection of the phase error at $n-1^{th}$ line.

Figure 6:
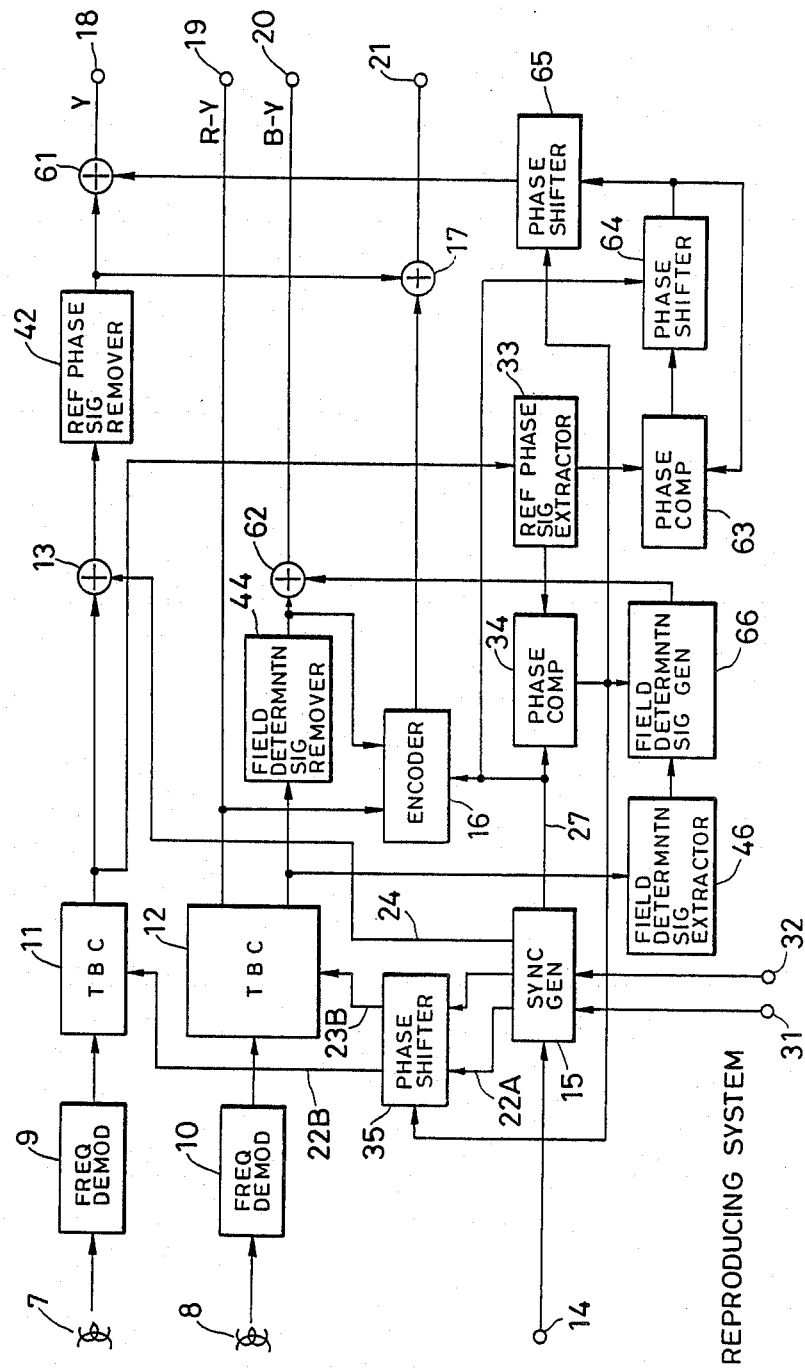
FIG. 6 is a block diagram showing a further embodiment of the present invention.

FIG. 6 shows another embodiment (only reproducing system), and this will be described.

In FIG. 6, the same numerals as in FIG. 2 indicate the same parts operating in the same manner.

In FIG. 6, the reference 61 and 62 are adders; 63, a phase comparator; 64 and 65, phase shifters; and 66, a field determination signal generator. As described in the above, when closed control or first to read control is performed as the phase control of a reproducing system, since the reference phase signal indicates the phase of the chrominance subcarrier within the original input composite video signal, correct operation can be effected on encoding after dubbing even if the signal is outputted as being attached to the Y signal as it is. However, it is preferable to newly replace the same since it includes noise etc on recording/reproducing. Furthermore, in the case of open control, TBC output reference phase signal does not represent the phase of the original chrominance subcarrier. Therefore, as shown in FIG. 6, the phase of the reference phase signal extracted by the reference phase signal extractor 33 is compared by the phase comparator 63 with the phase of the signal obtained by phase shifting the output chrominance subcarrier 27 from sync generator 15 by way of the phase shifter 64, and by controlling the phase shifter 64 using an output resultant error signal, a signal which is in phase with the reference phase signal is obtained at the output of the phase shifter 64. Furthermore, the phase shifter 56 is controlled by the output signal from the phase comparator 34 to obtain as its output a signal which is in phase with the residual chrominance subcarrier including in the output luminance signal from the TBC 11, and then this signal is added to the TBC output luminance signal by the adder 61 to be outputted from the terminal 18. In the case of closed control, however, the phase shifter 65 is unnecessary, and the signal from the phase shifter 64 is added as the reference phase signal. In the case of first to read control, although the phase shifter 65 would be necessary if the reference phase signal read out in advance is led to the phase comparator 63, the phase shifter would be unnecessary if the reference phase signal read out together with the video signal after control is led to the phase comparator 63. In the case of closed control, the loop of the phase comparator 63 may be omitted so that the reference phase signal is directly produced from the chrominance subcarrier 27.

Figure 7:
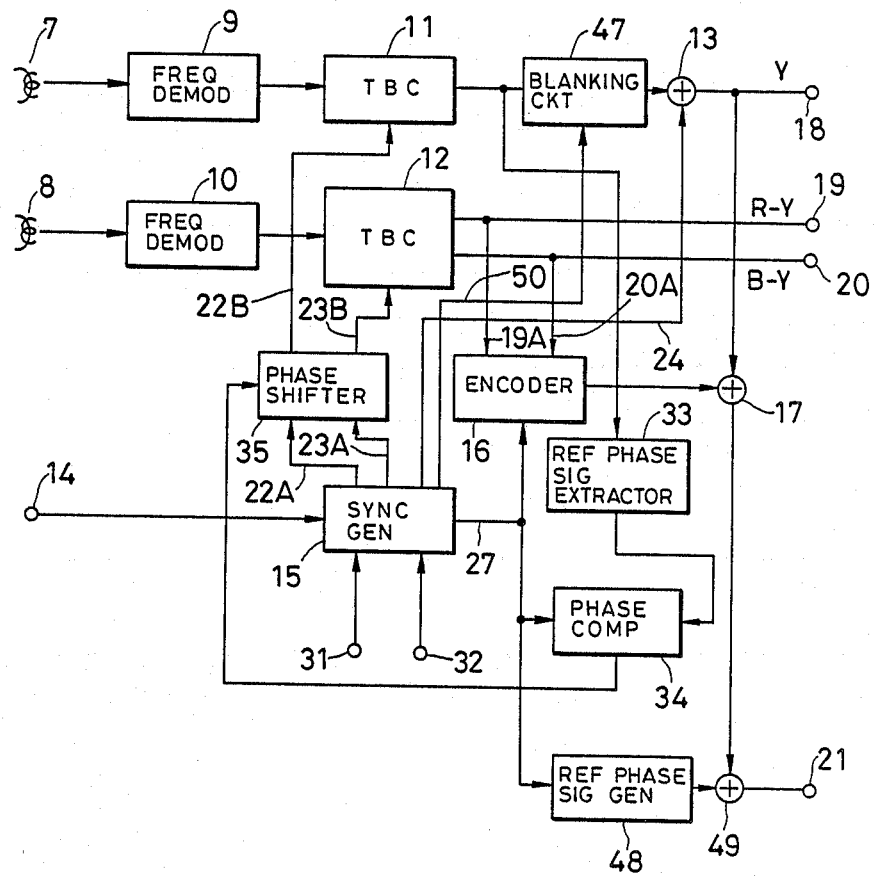
FIG. 7 is a block diagram showing a further embodiment of the present invention.

In the above description, it is assumed that the first signal is superimposed in the decoder in a recording system. However, as shown in FIG. 7 as another embodiment of the present invention, the same effect as the present invention would be obtained when a reference signal having the same frequency as the chrominance subcarrier is superimposed beforehand as outputting as a composite video signal in an encoder. This reference signal can also be used as a VIR signal which is currently used in broadcasting stations etc.

FIG. 7 shows the same structure as FIG. 2, and parts of the same numerals operate in the same manner. In this diagram, index information, which has been superimposed during recording, is blanked by the blanking circuit 47 in receipt of a blanking signal 50 from the sync generator 15. In addition, the reference chrominance subcarrier 27 is superimposed upon the composite video signal by the adder 49 as a reference signal (index signal), at one line within V blanking period by the reference phase signal generator 48 to be outputted from an output terminal 21.

Although the above-mentioned embodiments have been described with reference to only a VTR, the present invention can also be applicable to apparatus which processes other components.

In addition to the method of superimposition of the reference phase signal shown in the embodiment of FIG. 7, another method is available such that pulse superimposition is effected upon component color difference signals (R-Y and B-Y) at the position of 19-A or 20-A which are just before the inputs of the encoder of the same diagram at an appropriate one line within V blanking period. Specifically, the above-mentioned pulse is modulated to be identical signal with the reference phase signal obtained by the reference phase signal generator 48.

INDUSTRIAL APPLICABILITY

As described in the above, according to the present invention a composite video signal is split into a luminance signal and two chrominance signal components, and when obtaining the composite video signal again immediately after these signals are recorded/reproduced or transmitted or after repeating dubbing or transmission under the state of component, the distortion of the high frequency range of the luminance signal and the chrominance signal does not exist or is minimum so that it is possible to obtain a satisfactory signal.

We claim:

1. A video signal processing apparatus for use with a video signal recording/reproducing apparatus, said video signal processing apparatus being arranged to decompose an input color composite video signal into constituent signals including a luminance signal and a chrominance signal to be recorded by said video signal recording/reproducing apparatus, said chrominance signal comprising first and second chrominance signal components, and to produce a color composite signal by superimposing a carrier chrominance signal upon a luminance signal reproduced by said video signal recording/reproducing apparatus which carrier chrominance signal is obtained by modulating a reference color subcarrier with two chrominance signal components reproduced by said video signal recording/reproducing apparatus; characterized by:
   (a) superimposing means for superimposing a first signal indicative of phase of a color subcarrier included in said input color composite video signal upon either said luminance signal or said two chrominance signal components both to be recorded;
   (b) extracting means for extracting said first signal on reproduction;
   (c) phase comparison means for comparing phase between said first signal extracted and said reference color subcarrier; and
   (d) phase control means for controlling, in accordance with an output signal from said phase comparison means, phase of said luminance signal and said two chrominance signal components both reproduced.

2. A video signal processing apparatus as claimed in claim 1, wherein said superimposing means is arranged to superimpose said first signal having the same frequency as that of color subcarrier included in said input color composite video signal upon an appropriate line in a vertical blanking period of said luminance signal.

3. A video signal processing apparatus as claimed in claim 1, wherein said phase control means comprises memory means for storing reproduced luminance signal and two chrominance signal components, said memory means being controlled such that said memory read out timing is controlled by an output signal from said phase comparison means.

4. A video signal processing apparatus as claimed in claim 1, wherein said phase control means comprises delay means whose delay time is variable, reproduced luminance signal and two chrominance signal components being fed to said delay means, said first signal being extracted with said delay time being fixed only when said extracting means extracting said first signal, said delay time of said delay means being controlled in accordance with an output signal from said phase comparison means based on said first signal extracted.

5. A video signal processing apparatus as claimed in claim 1, wherein said phase control means comprises delay means whose delay time is variable, reproduced luminance signal and two chrominance signal components being fed to said delay means, said first signal being extracted by way of said extracting means from a processing system which does not pass through said delay means, said delay time being controlled in accordance with an output signal from said phase comparison means based on said first signal extracted.

6. A video signal processing apparatus as claimed in claim 1, wherein said phase control means comprises delay means whose delay time is variable, reproduced luminance signal and two chrominance signal components being fed to said delay means, said first signal being extracted in advance by way of said extracting means from said delay means with said delay time being fixed at an arbitrary blanking period of said video signal, said delay time being controlled in accordance with an output signal from said phase comparison means based on said first signal extracted.

7. A video signal processing apparatus for use with a video signal recording/reproducing apparatus, said video signal processing apparatus being arranged to decompose an input color composite video signal into constituent signals including a luminance signal and a chrominance signal to be recorded by said video signal recording/reproducing apparatus, said chrominance signal comprising first and second chrominance signal components, to input a color composite signal by superimposing a carrier chrominance signal upon a luminance signal reproduced by said video signal recording/reproducing apparatus, said carrier chrominance signal obtained by modulating a reference color subcarrier with two chrominance signal components; characterized by:
   (a) superimposing means for superimposing a first signal indicative of phase of a color subcarrier included in said input color composite video signal upon either said luminance signal or said two chrominance signal components both to be recorded;
   (b) extracting means for extracting said first signal on reproduction;
   (c) first phase comparison means for comparing phase between said first signal extracted and said reference color subcarrier;
   (d) phase control means for controlling, in accordance with an output signal from said first phase comparison means, phase of said luminance signal and said two chrominance signal components both reproduced;
   (e) signal producing means for producing a second signal having the same frequency as that of said reference color subcarrier; and
   (f) adding means for adding said second signal in place of said first signal to the reproduced luminance signal or two chrominance signal components.

8. A video signal processing apparatus as claimed in claim 7, wherein said signal producing means uses said reference solar subcarrier as said second signal.

9. A video signal processing apparatus as claimed in claim 7, wherein said signal producing means comprises variable phase shifting means for phase shifting by a variable amount said reference color subcarrier, said variable phase shifting means controlled by an output signal from said first phase comparison means.

10. A video signal processing apparatus as claimed in claim 7, wherein said signal producing means comprises a first variable phase shifting means for phase shifting by a variable amount said reference color subcarrier, a second phase comparison means for comparing phase between an output signal from said first variable phase shifting means and said reproduced first signal, a second variable phase shifting means for phase shifting, by a variable amount, an output signal from said first variable phase shifting means, said first variable phase shifting means being controlled by an output signal from said second phase comparison means, said second variable phase shifting means controlled by an output signal from said first phase shifting means so as to output a phase shifted signal.

11. A video signal processing apparatus for use with a video signal recording/reproducing apparatus, said video signal processing apparatus arranged to decompose an input color composite video signal into constituent signals including a luminance signal and a chrominance signal to be recorded by said video signal recording/reproducing apparatus, said chrominance signal comprising first and second chrominance signal components, and to produce a color composite signal by superimposing a carrier chrominance signal upon a luminance signal reproduced by said video signal recording/reproducing apparatus, said carrier chrominance signal obtained by modulating a reference color subcarrier with two chrominance signal components reproduced by said video signal recording/reproducing apparatus; characterized by:

(a) superimposing means for superimposing a first signal indicative of phase of a color subcarrier included in said input color composite video signal upon either said luminance signal or said two chrominance signal components both to be recorded;

(b) extracting means for extracting said first signal on reproduction;

(c) phase comparison means for comparing phase between said first signal extracted and said reference color subcarrier;

(d) phase control means for controlling, in accordance with an output signal from said phase comparison means, phase of said luminance signal and said two chrominance signal components both reproduced; and (e) second superimposing means for superimposing a second signal having the same frequency as that of said reference color subcarrier upon an appropriate line in a vertical blanking period of said color composite signal to be outputted.

12. A video signal processing apparatus as claimed in claim 11, wherein said second superimposing means is arranged to superimpose said second signal upon an appropriate line in vertical blanking period of either of said two chrominance signal components.

13. A video signal processing apparatus for use with a video signal recording/reproducing apparatus, said video signal processing apparatus arranged to decompose an input color composite video signal into constituent signals including a luminance signal and a chrominance signal to be recorded by said video signal recording/reproducing apparatus, said chrominance signal comprising first and second chrominance signal components, and to produce a color composite signal by superimposing a carrier chrominance signal upon a luminance signal reproduced by said video signal recording/reproducing apparatus, said carrier chrominance signal obtained by modulating a reference color subcarrier with two chrominance signal recording/reproducing apparatus; characterized by:

(a) superimposing means for superimposing a first signal indicative of phase of a color subcarrier included in said input color composite video signal upon either said luminance signal or said two chrominance signal components both to be recorded;

(b) extracting means for extracting said first signal on reproduction;

(c) phase comparison means for comparing phases between said first signal extracted and said reference color subcarrier; and (d) phase control means for controlling, in accordance with an output signal from said phase comparison means, phase of said reference color subcarrier.

14. A video signal processing apparatus as claimed in claim 13, wherein said superimposing means is arranged to superimpose said first signal having the same frequency as that of the color subcarrier included in said input color composite video signal upon an appropriate line in a vertical blanking period of either of said luminance signals.

* * * * *